(12) United States Patent
Haimer

(10) Patent No.: US 7,950,280 B2
(45) Date of Patent: May 31, 2011

(54) BALANCE RING AND METHOD FOR BALANCING A ROTATING COMPONENT

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 292 days.

(21) Appl. No.: 11/658,521

(22) PCT Filed: Jul. 27, 2005

(86) PCT No.: PCT/EP2005/008152
§ 371 (c)(1),
(2), (4) Date: Jan. 25, 2007

(87) PCT Pub. No.: WO2006/010607
PCT Pub. Date: Feb. 2, 2006

(65) Prior Publication Data
US 2008/0302181 A1   Dec. 11, 2008

(51) Int. Cl.
*G01M 1/16* (2006.01)
(52) U.S. Cl. .......................................................... 73/470
(58) Field of Classification Search .................. 73/468, 73/66, 457, 469, 470; 74/571.11
See application file for complete search history.

(56) References Cited

U.S. PATENT DOCUMENTS

| | | | | |
|---|---|---|---|---|
| 861,463 A | * | 7/1907 | Hyde | ............................ 451/343 |
| 2,241,637 A | * | 5/1941 | Ernst et al. | ........................ 73/458 |
| 2,861,471 A | * | 11/1958 | Kronenberg | ................ 74/571.11 |
| 4,253,806 A | * | 3/1981 | D'Amato | ...................... 418/61.1 |
| 4,951,526 A | * | 8/1990 | Linder | ........................... 74/570.1 |
| 5,074,723 A | * | 12/1991 | Massa et al. | ................... 409/131 |
| 5,154,554 A | * | 10/1992 | Ariyoshi | ......................... 409/141 |
| 5,263,995 A | * | 11/1993 | Mogilnicki et al. | ........... 409/131 |
| 5,466,049 A | * | 11/1995 | Harmsen | ....................... 301/5.22 |
| 5,555,144 A | * | 9/1996 | Wood et al. | ................. 360/98.08 |
| 6,125,098 A | | 9/2000 | Osawa | |
| 6,471,453 B1 | * | 10/2002 | Winebrenner et al. | ......... 409/141 |
| 6,947,253 B2 | * | 9/2005 | Pfeiffer et al. | .............. 360/99.08 |

(Continued)

FOREIGN PATENT DOCUMENTS

DE       2923800 A   * 12/1979

(Continued)

*Primary Examiner* — Hezron Williams
*Assistant Examiner* — Samir M Shah
(74) *Attorney, Agent, or Firm* — Scott D. Wofsy; Edwards Angell Palmer & Dodge LLP

(57) ABSTRACT

A balance ring for a component (1) rotating about a rotation axis (3), for example a tool holder for a rotating tool or else a machine spindle or the like, is proposed. The balance ring has an annular body (11) which is rotationally symmetrical with respect to an axis of rotational symmetry, a guide arrangement (13) guiding the annular body (11) in a radially movable but axially fixed manner on the component (1) with an axis of rotational symmetry essentially parallel to the rotation axis (3) of the component (1), and a plurality of adjusting elements (21) arranged in the circumferential direction of the annular body (11), preferably at equal angular distances from one another, radially supported between the annular body (11) and the component (1) and having a variable radial supporting length. The guide arrangement may be designed as an axially extending spring link arrangement or else as spring webs extending in the circumferential direction. Instead of the adjusting screws (21), electrically controllable actuators, such as, for example, piezoelectric elements or nanotube elements, may also be provided.

18 Claims, 3 Drawing Sheets

U.S. PATENT DOCUMENTS

| | | |
|---|---|---|
| 7,393,164 B2 * | 7/2008 | Chen .............................. 409/141 |
| 2004/0111872 A1 * | 6/2004 | Pfeiffer et al. ............. 29/603.01 |

FOREIGN PATENT DOCUMENTS

| | | |
|---|---|---|
| JP | 56-126650 | 2/1955 |
| JP | 62-140343 | 6/1987 |
| JP | 3-33003 | 2/1991 |
| JP | 5-62754 | 1/1992 |
| JP | 6-239155 | 8/1994 |
| JP | 10-68667 | 3/1998 |
| SU | 1037095 A * | 8/1983 |
| WO | WO 94/16852 | 8/1994 |
| WO | WO 2008003507 A1 * | 1/2008 |

* cited by examiner

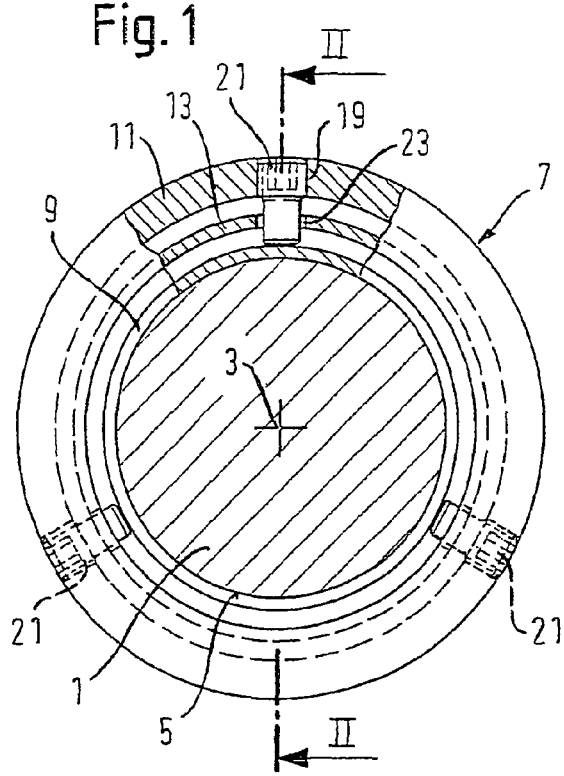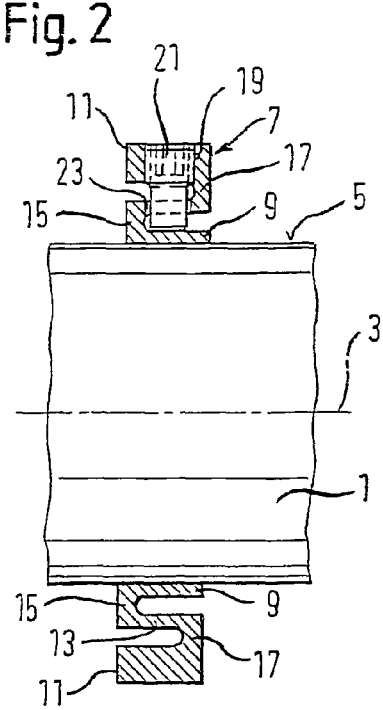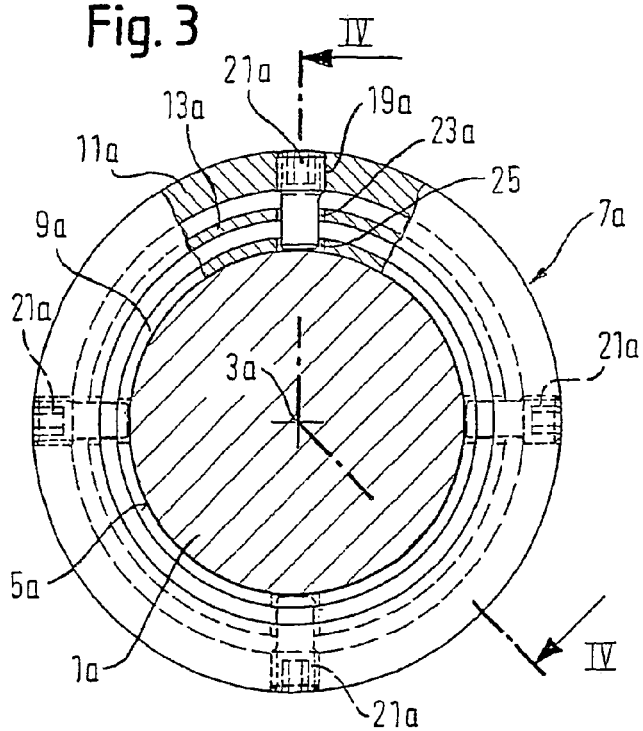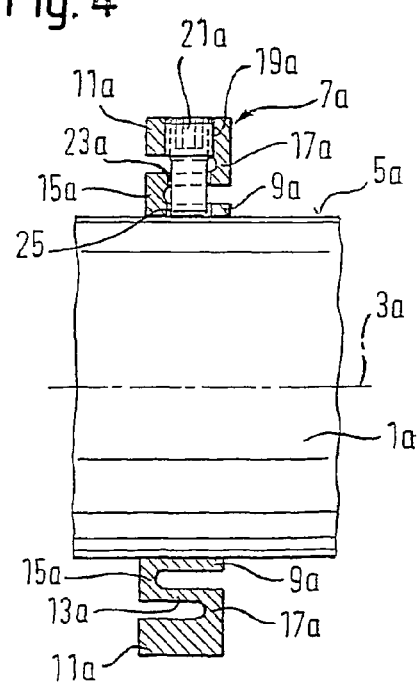

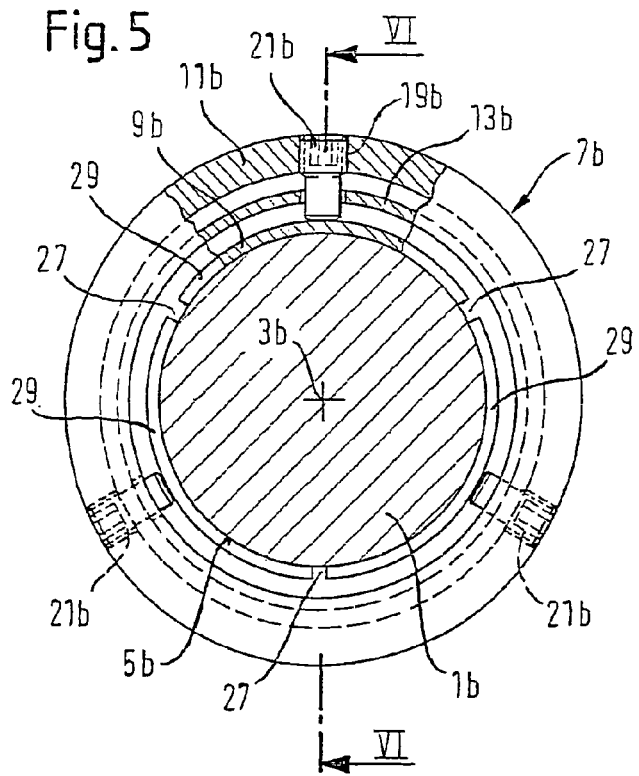
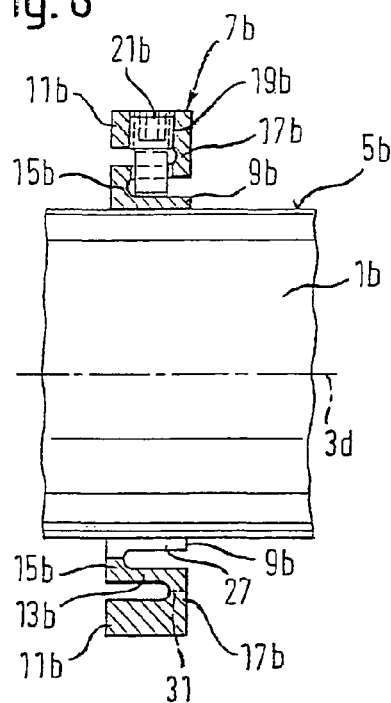
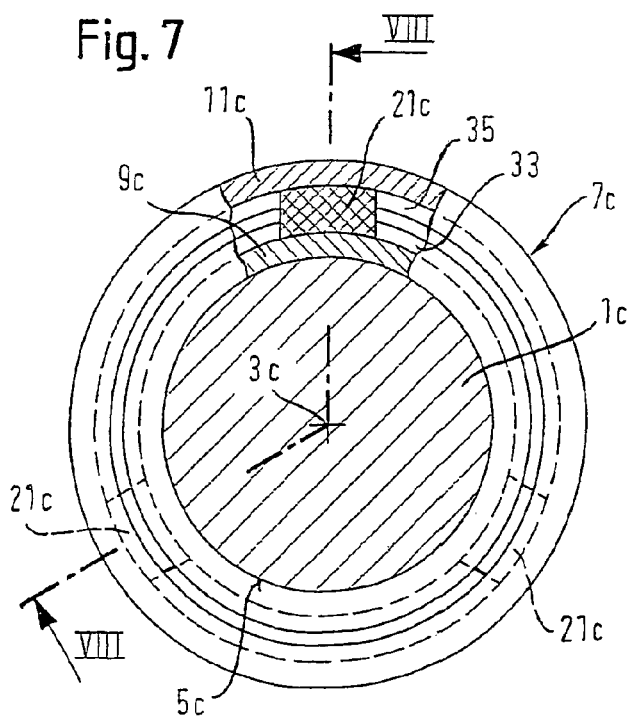
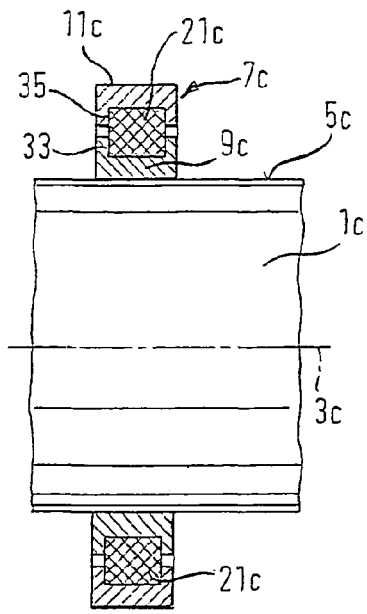

BALANCE RING AND METHOD FOR BALANCING A ROTATING COMPONENT

The invention relates to a balancing ring and a method for balancing a component rotating about a rotation axis, in particular a tool holder or the like.

Rotating machine elements, such as, for example, tool holders which can be coupled to the drive spindle of a machine tool and are intended for drill bits, milling cutters or the like, but also other rotating components, such as, for example, spindles or shafts, are balanced in a conventional manner by means of balance rings which are rotatably mounted on the component in pairs axially next to one another concentrically to the rotation axis of the component. The two balance rings have eccentric centers of mass, the resulting unbalance force of which, which depends on the relative rotary position of the two balance rings, is set in opposition to the unbalance force of the component in a compensating manner during the balancing of the component. The size of the resulting unbalance force of the balance rings can be varied by rotating the balance rings relative to one another. The effective direction of the resulting unbalance force can be varied by jointly rotating the two balance rings.

Conventional balance ring pairs require exactly machined rotary guide surfaces and a comparatively large construction space. Against this background, the object of the invention is to provide an adjustable balance ring having dimensions which are reduced with respect to the maximum unbalance of the balance ring.

The balance ring according to the invention for a component rotating about a rotation axis, in particular a tool holder or the like, comprises:
- an annular body which is rotationally symmetrical with respect to an axis of rotational symmetry,
- a guide arrangement guiding the annular body in a radially movable but axially fixed manner on the component with an axis of rotational symmetry essentially parallel to the rotation axis of the component, and
- a plurality of adjusting elements arranged in the circumferential direction of the annular body, preferably at equal angular distances from one another, radially supported between the annular body and the component and having a variable radial supporting length.

Such a balance ring is rotationally symmetrical overall, a rotationally symmetrical design being intended here and below to refer to a shape which can be made congruent with itself when rotated about the axis of rotational symmetry in angular steps of uniform size. Such a shape can be made very precisely and in a reproducible manner. Unlike in the case of conventional balance ring pairs, which have to be guided on the component in such a way as to be rotatable about the rotation axis of said component, the balance ring according to the invention is fastened centrally to the component, but in a fixed manner in the circumferential direction. The annular body, which in its basic position is concentric to the rotation axis of the component, is guided on the component by means of the guide arrangement in such a way as to be radially deflectable universally in the circumferential direction, wherein the angular position in which the annular body is radially deflected relative to the component and the extent of the radial deflection establish the size and direction of the unbalance force determined for compensating for any unbalance of the component. Three or more adjusting elements are provided in a distributed manner in the circumferential direction, and these adjusting elements enable the annular body to be fixed relative to the component with an axis of rotational symmetry essentially parallel to the rotation axis, but with an eccentricity selectable according to size and direction.

The guide arrangement primarily ensures that the annular body is guided in a radially movable manner on the component with an axis of rotational symmetry essentially parallel to the rotation axis of the component. Suitable for this purpose are, for example, annular disk surfaces which are arranged at an axial distance from one another, are in the form of annular disks and run axially normal to the rotation axis and between which the annular body sits in a radially displaceable manner. However, configurations in which the annular body is fixed on the component by means of a spring link arrangement radially displaceable universally is especially advantageous. This configuration has the advantage that the annular body can assume a rest position which is concentric to the rotation axis of the component and from which it can be deflected against the spring forces of the spring link arrangement by means of the adjusting elements. In this way, the annular body can automatically assume its concentric rest position in which the unbalance of the component can be determined, without this unbalance being distorted by eccentricities of the annular body. In a preferred configuration, provision is made for the guide arrangement to have a retaining ring which bears against a cylindrical circumferential surface, concentric to the rotation axis, of the component and which is connected to the annular body via the spring link arrangement radially deflectable universally. However, the rest position may also lie eccentrically to the rotation axis of the component, since the eccentricity can also be taken into account during the balancing operation.

The spring link arrangement may be arranged along a circle concentric to the axis of rotational symmetry and comprise at least one radially deflectable spring element which extends essentially in the direction of the axis of rotational symmetry and which—as viewed axially—is connected with its one end region to the retaining ring and with its other end region to the annular body. Such a spring link arrangement works according to the principle of a parallel link arrangement having elastic links. The spring element in this case may be a radially elastically deflectable sleeve concentric to the axis of rotational symmetry. The sleeve may have a sleeve wall closed in a ring shape, but it may also be subdivided in the circumferential direction into radially deflectable spring segments or spring webs by a plurality of axially running slots. It goes without saying that the slot width may also be larger, if need be, than the width of these spring segments in the circumferential direction.

In a variant, the spring link arrangement, in a distributed manner in the circumferential direction, may comprise a plurality of pairs of spring webs which extend in the circumferential direction and which are held with their ends which are adjacent in the circumferential direction in pairs on the annular body or in pairs on the retaining ring and are held with their ends which are remote in the circumferential direction on the other respective component—retaining ring or annular body. An advantage of the last-mentioned spring webs is that they permit comparatively long flexible web lengths and are able during the radial displacement of the annular body to radially guide the latter exactly.

The annular body, the spring arrangement and the retaining ring may be separately produced components which can be subsequently combined to form the balance ring. In a preferred configuration, however, the annular body, the spring arrangement and the retaining ring are integrally formed in one piece, which improves the precision of the balance ring.

The retaining ring may be a closed ring which is pushed onto or fastened to the corresponding circumferential surface of the component in an accurately fitting manner. The retaining ring is expediently fastened to the component by heat shrinking technique. It goes without saying that other, conventional types of fastening may also be used, for example by screwing to the component or by clamping in place by means of clamping screws. It goes without saying that the retaining ring can also be brazed, welded or adhesively bonded to the component. It is also conceivable to provide the retaining ring with an internal thread, via which it can be screwed to the component.

However, the retaining ring may also be designed as a segmented ring, the segments of which are connected to the annular body via the spring arrangement. The retaining ring segments may have radially elastic properties, as a result of which the balance ring can be held on the component via a radially flexible clamping fit. However, the types of fastening explained above may be used here too.

The adjusting elements may be adjusting screws which can be screwed down radially. The adjusting screws can be screwed into a thread of the retaining ring and be supported on the annular body. However, a variant in which the adjusting screws are arranged in screw holes of the annular body and are supported on the retaining ring or directly on the component can be produced and set in a simpler manner.

It goes without saying that, instead of radially movable adjusting elements, other adjusting elements radially deflecting the annular body may also be provided. For example, adjusting elements based on sloping surface guides or link guides which allow an adjusting movement of the link element deviating from the radial movement are suitable. For example, the adjusting element may be designed as a wedge surface mechanism in which the wedge movable either in the circumferential direction, but preferably in the axial direction, adjusts the annular body radially. If the adjusting movement of such an adjusting element runs parallel to the rotation axis, the adjusting elements do not affect the angular position of the unbalance vector of the annular body.

The adjusting elements explained above are mechanical elements of a mechanism which enable the supporting length to be varied. In a variant, provision may be made for the guide arrangement to have a retaining ring which bears against a cylindrical circumferential surface, concentric to the rotation axis, of the component and on which the annular body is supported via a plurality of actuators which are distributed in the circumferential direction, form the adjusting elements and have an electrically controllable radial supporting length. Such actuators may be piezoelectric elements or nanotube elements or the like, which change their spatial dimensions when an electrical voltage or current is applied.

From a second aspect, the invention relates to a method for balancing a component rotating about a rotation axis by means of a balance ring attached to the component. The method is characterized in that a balance ring having an annular body guided on the component in a radially movable manner is attached to the component, which balance ring is supported relative to the component via a plurality of adjusting elements arranged in the circumferential direction of the annular body, preferably at equal angular distances from one another, and having a variable supporting length, in that the component together with the balance ring is rotationally driven about the rotation axis, and an unbalance parameter representing the size and direction of the unbalance force occurring in the process is measured, and in that the supporting length of the adjusting elements is varied as a function of the measured unbalance parameter in such a way that the annular body is displaced into a radial position compensating for the unbalance force. In this case, length-setting information for the adjusting elements is determined as a function of the measured unbalance parameter. For example, this may be done in such a way that the value by which each of the adjusting elements has to be varied in its supporting length is indicated on a display of the balancing machine measuring the unbalance parameter, in order to compensate for the unbalance of the component. In so far as adjusting screws are provided as adjusting elements, the display can indicate the number and direction of the turns required by each individual adjusting screw.

Exemplary embodiments of the invention are explained in more detail below with reference to a drawing, in which:

FIG. 1 shows a partly cutaway axial section of a balance ring according to the invention;

FIG. 2 shows an axial longitudinal section of the balance ring along line II-II in FIG. 1;

FIG. 3 shows a partly cutaway axial section of a first variant of the balance ring from FIG. 1;

FIG. 4 shows an axial longitudinal section of the first variant along line IV-IV in FIG. 3;

FIG. 5 shows a partly cutaway axial section of a second variant of the balance ring from FIG. 1;

FIG. 6 shows an axial longitudinal section through the second variant along line VI-VI in FIG. 5;

FIG. 7 shows a partly cutaway axial section of a second embodiment of a balance ring;

FIG. 8 shows an axial longitudinal section through the second embodiment along line VIII-VIII in FIG. 7;

Figure 9:
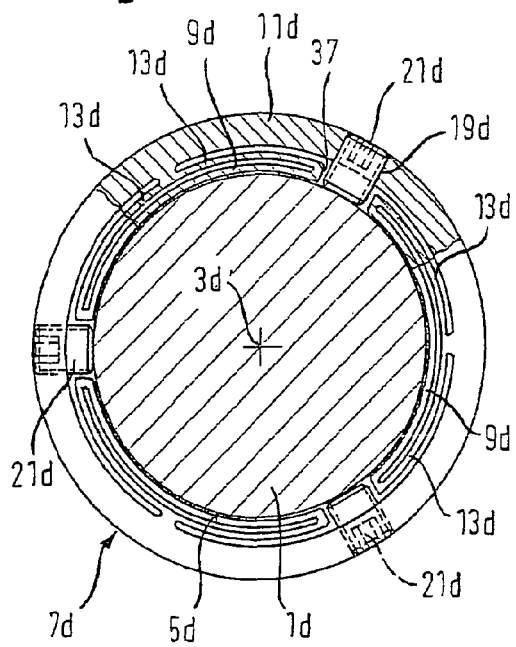
FIG. 9 shows a partly cutaway axial section of a third embodiment of a balance ring.

To balance a component designated overall by 1 in FIGS. 1 and 2 and rotating about a rotation axis 3, for example a tool holder, a tool, a shaft or a work spindle of a machine, a radially adjustable balance ring 7 is fastened to a circular-cylindrical circumferential surface 5 of the component. The balance ring 7 has a retaining ring 9, which is in the form of a closed ring and with which it is held, for example, in a shrink-fit seat on the circumferential surface 5, and an annular body 11 which forms the balance mass and which is connected to the retaining ring 9 via a spring link arrangement in the form of a sleeve 13 extending coaxially to the rotation axis 3 radially between the retaining ring 9 and the annular body 11. The sleeve 13 essentially has a circumferential wall closed in a ring shape and is connected at its one end over its entire circumference to the retaining ring 9 by means of a radial web 15 and at its other axial end over its entire circumference to the annular body 11 by means of a radial web 17.

The sleeve 13 holds the annular body 11 in a rest position which is concentric to the rotation axis 3 and from which the annular body 11 can be deflected radially in an elastic manner under radially elastic deformation of the sleeve 13 with an axis of rotational symmetry essentially parallel to the axis 3 of rotation. In the process, the sleeve 13 acts universally in the circumferential direction like a parallel link arrangement.

Three adjusting screws 23 which are accessible radially on the outside and can be screwed radially sit in tapped holes 19 of the annular body 11 in such a way as to be distributed in the circumferential direction at equal angular distances apart, said adjusting screws 21 passing through the sleeve 13 in through-holes 23 and being supported on the outer circumference of the retaining ring 9, which in turn is fixed to the component. By the adjusting screws 21 being screwed down, the annular body 11 can be adjusted, with an axis of rotational symmetry essentially parallel to the axis 3 of rotation, from its rest position concentric to the axis 3 of rotation radially into an eccentric position, the size and angular position of the eccentricity being selectable by the setting of the three adjusting screws 21. The eccentricity of the annular body 11 is selected in such a way that the unbalance force produced by the annular body 11 and possibly by the sleeve 13 compensates for any unbalance of the component 1.

The unbalance of the component 1 is measured in a conventional manner according to size and angular position during rotation on a balancing machine. In accordance with the unbalance parameter thus determined, the balancing machine determines the size and angular position of the eccentricity of the balance ring 7 required for compensating for the unbalance and expediently delivers adjusting parameters for the adjusting screws 21, for example in the form of screw angle information for each of the adjusting screws 21. It goes without saying that it is not absolutely necessary for the unbalance parameters to be determined starting from the rest position of the annular body 11. On the contrary, any position of the annular body 11, even an eccentric position, which then leads to setting values for the adjusting screws 21 which take into account the arbitrary initial position of the annular body 11 is suitable.

In the exemplary embodiment described above, the retaining ring 9 is shrunk onto the circumferential surface 5 of the component 1 by the heat shrinking process, such that it is held on the component 1 by interference fit forces. It goes without saying that the retaining ring 9 may also be fastened to the component 1 in another way, for example it may be welded, brazed or adhesively bonded in place. The retaining ring 9 may also be fastened in a positive-locking manner, for example by means of a thread on its inner circumference, or else it may be fixed or screwed on by clamping means, for example clamping screws.

The retaining ring 9, the sleeve 13 and the annular body 11 are integrally connected to one another in one piece and are preferably made of metal.

Variants and configurations of the balance ring are explained below. Components having the same effect are each provided with reference numerals explained above and are provided with a letter for differentiation. To explain the construction, the mode of operation and possible variants, reference is made in each case to the above description.

The balance ring 7 according to FIGS. 1 and 2 has three adjusting screws 21 which can be screwed down radially on the annular body 11 and are offset from one another by an angle of 120°. FIGS. 3 and 4 show a variant of a balance ring 7a which, in contrast to the balance ring 7 of FIGS. 1 and 2, comprises four adjusting screws 21a which are offset from one another by a respective angle of 90° and can be screwed down radially on the annular body 11a. In addition, the adjusting screws 21a are not supported on the retaining ring 9a, but rather pass through through-holes 25 of the retaining ring 9a and are supported directly on the circumferential surface 5a of the component 1a.

FIGS. 5 and 6 show a further variant of the balance ring 7 which is explained with reference to FIGS. 1 and 2 and whose retaining ring 9 is in the form of a closed ring. In contrast thereto, the retaining ring 9b of the balance ring 7b of FIGS. 5 and 6 is subdivided by a plurality of slots 27 into segments 29 which bear radially in a flexible manner against the circumference 5b of the component 1b and fix the balance ring 7b on the component 1b. The slots 27 may be restricted to the retaining ring 9b. However, they may also extend into the radial webs 15b and if need be into the sleeve 13b and the radial web 17b, as indicated at 31 in FIG. 6. Even though the adjusting screws 21b may also be supported directly on the component 1b, they are preferably supported here on the segments 29 in order to improve the fixing of the balance ring 7b on the component 1b. It goes without saying that, instead of the three adjusting screws 21b shown in FIG. 5, there may also be more adjusting screws.

In the embodiments in FIGS. 1-6, the adjusting elements are designed as adjusting screws to be operated manually. FIGS. 7 and 8 show the variant of a balance ring 7c in which the adjusting elements are designed as electrically controllable actuators 21c which change their radial dimensions when fed with electrical signals, which is not shown in any more detail. The actuators 21c are, for example, piezoelectric elements or nanotube elements or the like. The actuators 21c sit in guide openings on the outer lateral surface of the retaining ring 9c on the one hand and on the inner lateral surface of the annular body 11c on the other hand and thus take over both the radial and axial guidance and fixing of the annular body 11c on the retaining ring 9c. As shown in FIGS. 7 and 8, the guide openings may be formed as annular grooves 33 and 35, respectively, in which the actuators 21c are fixed in each case at equal angular distances apart. It goes without saying that electrically controllable actuators may also be used in the exemplary embodiments explained above and in the following exemplary embodiments. The retaining ring 9c may be fastened to the outer circumference 5c of the component 1c in the manner explained above.

In the preceding variants explained with reference to FIGS. 1-6, the spring properties are primarily determined by the axial length of the sleeve forming the spring link arrangement. The dimensions of the balance ring in the axial direction can be kept small if, as in the exemplary embodiments explained below, the flexible length of the spring link arrangement does not extend in the axial direction but rather in the circumferential direction of the annular body. A comparatively large construction space is available in the circumferential direction for accommodating the spring link arrangement. Thus, FIG. 9 shows a variant of a balance ring 7d whose annular body 11d is connected to the individual segments 9d of a retaining ring, subdivided into a plurality of segments in the circumferential direction, via a plurality of pairs of spring webs 13d extending in the circumferential direction. In the exemplary embodiment shown, the retaining ring consists of three segments 9d which follow one another in the circumferential direction, with gaps 37 being formed, wherein adjusting screws 21d which sit in tapped holes 19d and can be screwed down radially pass through these gaps 37 and are supported directly on the outer circumference 5d of the component 1d.

The pairs of spring webs 13d, which are essentially designed as leaf springs curved in the circumferential direction, are each connected with their ends remote from one another to the ends, situated in the circumferential direction, of one of the retaining ring segments 9d. Those ends of the spring webs 13d of the pair which are adjacent to one another are connected to the annular body 11d centrally between adjusting screws 21d following one another in the circumferential direction.

The retaining ring segments 9d may be fixed to the component 1d on account of their inherent elasticity; however, they may also be fastened in another way, for example adhesively bonded or brazed or screwed in place.

Figure 10:
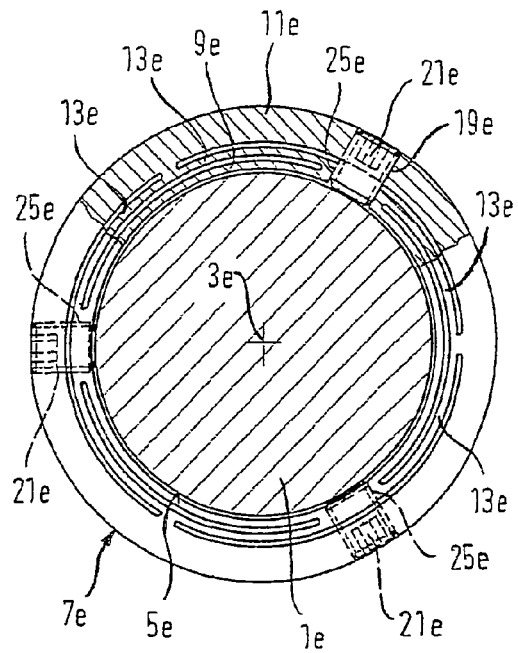
FIGS. 10 to 12 show partly cutaway axial sections of variants of the balance ring in FIG. 9.

The balance ring 7e of FIG. 10 differs from the balance ring 7d of FIG. 9 essentially only in that the retaining ring 9e is designed in the form of a closed retaining ring which, in a similar manner to the variant of FIGS. 3 and 4, is provided with through-holes 25e for the passage of the adjusting screws 21e, through which through-holes 25e the latter can be supported directly on the outer circumference 5e of the component 1e. The spring webs 13e are each connected to the retaining ring 9e in the circumferential direction on both sides of each adjusting screw 21e.

Figure 11:
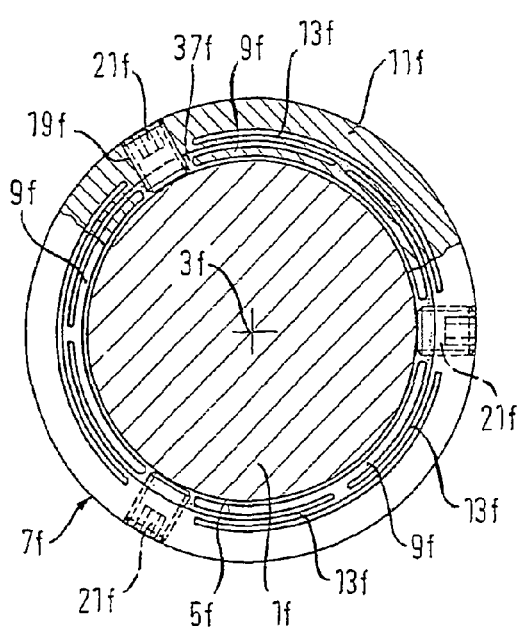

The variant of the balance ring 7f shown in FIG. 11 differs from the balance ring 7d in FIG. 9 only in that the segments 9f, forming a segmented retaining ring, are not connected in pairs at their ends facing away from one another to the spring webs 13f extending in the circumferential direction, but rather are each connected in their center region between two adjusting screws 21f following one another in the circumferential direction. The spring webs 13f of each pair are accordingly connected to the annular body 11f at their ends which are remote in the circumferential direction. In the variant in FIG. 11, the retaining ring segments 9f also form gaps 37f, through which the adjusting screws 21f bear directly against the outer circumference 5f of the component 1f.

Figure 12:
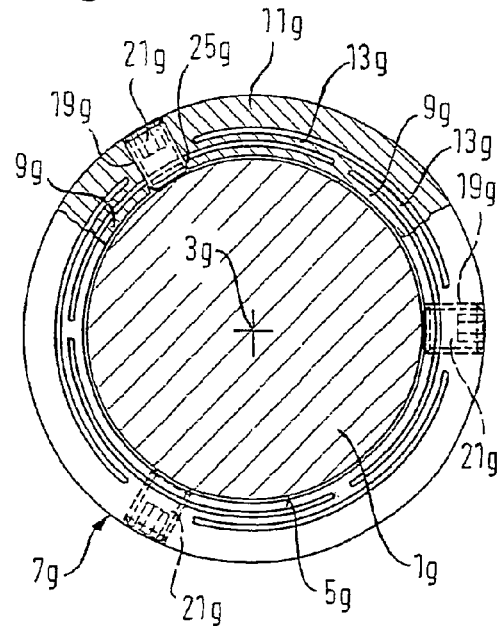

FIG. 12 shows a variant of a balance ring 7g in which the retaining ring 9g is in the form of a closed ring in accordance with the variant in FIG. 10, the adjusting screws 21g again passing through through-holes 25g and being supported directly on the outer circumference 5g of the component 1g. In contrast to the balance ring 7e in FIG. 10, however, in the balance ring 7g the spring webs 13g arranged in pairs between two adjusting screws 21g following one another in the circumferential direction are connected to the retaining ring 9g with their ends which are adjacent to one another, whereas the ends which are remote from one another are connected to the annular body 11g axially on both sides of the through-holes 25g.

It goes without saying that the adjusting screws 21g and 21e of the balance ring shown in FIGS. 10 and 12 may also be supported on the retaining ring which is in the form of a closed ring, as has been explained for the balance ring 7 in FIGS. 1 and 2. The retaining rings may be fixed to the component by shrink fitting, adhesive bonding, welding, as has been explained above.

The invention claimed is:

1. A balance ring for a component rotating about a rotation axis, comprising:
   a) an annular body which is rotationally symmetrical with respect to an axis of rotational symmetry;
   b) a guide arrangement guiding the annular body on the component in a radially movable but axially fixed manner with the axis of rotational symmetry essentially parallel to the rotation axis of the component; and
   c) a plurality of adjusting elements arranged in the circumferential direction of the annular body radially supported between the annular body and the component and having a variable radial supporting length, the plurality of adjusting members adapted to radially fix the annular body relative to the component with the axis of rotational symmetry being eccentric with respect to the rotation axis.

2. The balance ring as claimed in claim 1, wherein the guide arrangement has a retaining ring which bears against a cylindrical circumferential surface, concentric to the rotation axis, of the component and which is connected to the annular body via a spring link arrangement radially deflectable universally.

3. The balance ring as claimed in claim 2, wherein the spring link arrangement is arranged along a circle concentric to the axis of rotational symmetry and comprises at least one radially deflectable spring element which extends essentially in the direction of the axis of rotational symmetry and which, as viewed axially, is connected with its one end region to the retaining ring and with its other end region to the annular body.

4. The balance ring as claimed in claim 3, wherein the spring element is an elastically deflectable sleeve concentric to the axis of rotational symmetry.

5. The balance ring as claimed in claim 4, wherein the sleeve is subdivided in the circumferential direction into radially deflectable spring segments by a plurality of axially running slots or apertures.

6. The balance ring as claimed in claim 2, wherein the spring link arrangement, in a distributed manner in the circumferential direction, comprises a plurality of pairs of spring webs which extend in the circumferential direction and which are held with their ends which are adjacent in the circumferential direction in pairs on one of the annular body and the retaining ring, and are held with their ends which are remote in the circumferential direction on the other of the annular body and the retaining ring.

7. The balance ring as claimed in claim 2, wherein the annular body, the spring arrangement and the retaining ring are integrally formed in one piece.

8. The balance ring as claimed in claim 2, wherein the retaining ring is configured as a closed ring.

9. The balance ring as claimed in claim 8, wherein the retaining ring is adapted to be shrunk onto the component.

10. The balance ring as claimed in claim 2, wherein the retaining ring is configured as a segmented ring, the segments of which are connected to the annular body via the spring arrangement.

11. The balance ring as claimed in claim 1, wherein the adjusting elements are configured as adjusting screws which can be screwed down radially.

12. The balance ring as claimed in claim 11, wherein the guide arrangement has a retaining ring which bears against a cylindrical surface of the component and the adjusting screws are arranged in screw holes of the annular body and are supported on the retaining ring or directly on the component.

13. The balance ring as claimed in claim 1, wherein the guide arrangement has a retaining ring which bears against a cylindrical circumferential surface, concentric to the rotation axis, of the component and on which the annular body is supported via a plurality actuators, which are distributed in the circumferential direction, form the adjusting elements, and have a controllable radial supporting length.

14. The balance ring as claimed in claim 13, wherein the actuators are designed as piezoelectric elements or nanotube elements.

15. A balance ring as recited in claim 1 wherein the component is a tool holder.

16. The balance ring as claimed in claim 15, wherein the annular body, the spring arrangement and the retaining ring are integrally formed in one piece.

17. A balance ring as recited in claim 1, wherein the adjusting elements are arranged in the circumferential direction of the annular body at equal angular distances from one another.

18. A balance ring for a component rotating about a rotation axis, comprising:
   a) an annular body which is rotationally symmetrical with respect to an axis of rotational symmetry;
   b) a guide arrangement guiding the annular body on the component in a radially movable but axially fixed manner with an axis of rotational symmetry essentially parallel to the rotation axis of the component wherein the guide arrangement has a retaining ring which bears against a cylindrical circumferential surface, concentric to the rotation axis, of the component and which is connected to the annular body via a spring link arrangement radially deflectable universally; and
   c) a plurality of adjusting elements arranged in the circumferential direction of the annular body, radially supported between the annular body and the component and having a variable radial supporting length.

* * * * *